United States Patent [19]

Lane et al.

[11] Patent Number: 4,554,185

[45] Date of Patent: Nov. 19, 1985

[54] ANTI-FOULING COATING COMPOSITION, PROCESS FOR APPLYING SAME AND COATING THEREBY OBTAINED

[75] Inventors: Thomas Lane, Lutz; Murray Rosen, Seminole, both of Fla.

[73] Assignee: Marine Shield Corporation, St. Petersburg, Fla.

[21] Appl. No.: 640,973

[22] Filed: May 15, 1984

[51] Int. Cl.$^4$ .......................... B05D 5/00; C09D 5/14
[52] U.S. Cl. ........................ 427/385.5; 106/15.05; 106/18; 106/18.32; 106/18.35; 422/6; 428/907; 523/122; 526/240
[58] Field of Search ............. 106/18.35, 16, 18, 15.05, 106/18.32; 524/198; 526/240; 427/388.1, 388.5, 385.5; 428/411.1, 425.1, 425.8, 907; 422/6; 523/122

[56] References Cited

U.S. PATENT DOCUMENTS

| | | | |
|---|---|---|---|
| 3,167,473 | 1/1965 | Leebrick | 106/15.05 X |
| 3,502,601 | 3/1970 | Case et al. | 521/172 |
| 3,666,724 | 5/1972 | Hostettler | 528/80 |
| 3,684,752 | 8/1972 | Goto et al. | 106/18 |
| 3,979,354 | 9/1976 | Dyckman et al. | 106/18.35 X |
| 4,039,487 | 8/1977 | Kolakowski et al. | 521/129 |
| 4,082,709 | 4/1978 | Dyckman et al. | 526/240 X |
| 4,497,852 | 2/1985 | Laue et al. | 106/18.32 |

OTHER PUBLICATIONS

Rosen et al., copending application Ser. No. 640,972, filed 8/15/84.

*Primary Examiner*—Evan K. Lawrence

[57] ABSTRACT

The anti-fouling compositions and process described herein are capable of preventing or delaying for prolonged periods the fouling of structures such as boats, ships, piers, etc., having substantial portions thereof submerged in water. Processes are described herein for preparing and applying these compositions as coatings to objects to be submerged in sea water. These compositions comprise a number of components, some of which may be coreacted, including: (a) an organic polymeric material having carboxylic acid groups therein which have been reacted with a trihydrocarbyl tin compound to produce ester derivative groups therein; (b) a hydrophilic component having poor water solubility, preferably being water insoluble and having at least two hydroxy groups per molecule, such as castor oil, partially hydrolyzed polyvinyl acetate, partially hydrolyzed copolymers of vinyl chloride and vinyl acetate, hydroxy-containing polyacrylates or polymethacrylates, such as ply(2-hydroxy-ethyl methacrylate), polymers of monovinyl ether of alkylene glycols such as ethylene glycol, etc.; (c) a hydrophobic component comprising a compound having 1–3 urethane groups therein and no more than about 20 carbon atoms preferably made by the reaction of an isocyanate compound, such as diisocyanate, with one or more hydroxy-containing solvents, such as ethanol, propanol, ethylene glycol monoethyl ether, etc., or a monoisocyanate with a di- or trihydroxy compound such as ethylene glycol, propylene glycol, glycerine, etc., preferably in the presence of low molecular weight ketones, esters and aromatic hydrocarbons, such as methyl ethyl ketone, cyclohexanone, toluene, etc.

37 Claims, No Drawings

ANTI-FOULING COATING COMPOSITION, PROCESS FOR APPLYING SAME AND COATING THEREBY OBTAINED

FIELD OF THE INVENTION

This invention relates to an anti-fouling paint composition, a process of applying said composition as a coating to objects to be submerged in sea water and the coating thereby obtained. More specifically it relates to an anti-fouling composition containing a tin-containing polymer derived from a polymeric material having carboxylic acid groups therein. Still more specifically it relates to such a composition also containing a hydrophilic component and a hydrophobic component.

BACKGROUND OF THE INVENTION

The fouling of structures such as boats, ships, piers, etc. submerged to a considerable extent in sea water in well-known and comprises a tremendous problem. Various compositions have been suggested as anti-fouling paints.

Some of these paint compositions are disclosed in Leebrick, U.S. Pat. No. 3,167,473; Goto et al, U.S. Pat. No. 3,684,752; Dyckman, et al, U.S. Pat. Nos. 3,979,354 and 4,082,709. These compositions contain various biologically active organotin compounds. However, the particular compositions show poor adhesion, objectionable film softness, poor abrasion resistance and high leaching rates.

OBJECTIVES OF THIS INVENTION

It is an objective of this invention to provide improved anti-fouling paint compositions having good adhesion, film hardness, good abrasion resistance, good resistance to leaching and long life.

It is also an objective of this invention to provide such paint compositions which prevent or give prolonged retardation of the fouling of objects submerged to a substantial extent in sea water.

These and other objectives, as made apparent hereinafter, are accomplished by the application of the composition of this invention to objects to be submerged in sea water.

SUMMARY OF THE INVENTION

In accordance with the present invention a new anti-fouling paint composition has been found which comprises: (a) an organotin polymeric material derived from a polymeric material having carboxylic acid groups therein available for reaction with a trihydrocarbyl tin compound such as $R_3SnOH$ or $R_3Sn-O-SnR_3$ wherein R is a lower alkyl (including cycloalkyl and aralkyl) or aryl group of 1-12 carbon atoms, preferably 1-8 carbon atoms; (b) a hydrophilic component having at least two hydroxy groups per molecule, such as castor oil, partially hydrolyzed polymers of polyvinyl acetate having a hydroxyl equivalent weight of 300-600; partially dehydrated castor oil having a hydroxyl equivalent weight of 600-800; partially hydrolyzed copolymers of vinyl chloride and vinyl acetate having a hydroxyl equivalent weight of 300-600; hydroxy-containing polyacrylates or polymethacrylates, such as polymers or copolymers of 2-hydroxyethyl methacrylate, etc., or copolymers of 2-hydroxyethyl methacrylate, etc., polymers of monovinyl or monoalphamethyl (or ethyl)-vinyl ethers of alkylene glycols having 2-6 carbon atoms, such as ethylene glycol, diethylene glycol, propylene glycol, etc. having a hydroxyl equivalent weight of 300-600; (c) a hydrophobic component having 1-3 urethane groups and advantageously no more than 35, preferably no more than 20 carbon atoms, advantageously comprising the reaction product of an isocyanate with one or more hydroxy-containing solvents, such as methanol, ethanol, propanol, butanol, ethylene glycol monoethyl ether, etc., preferably in the presence of low molecular weight ketones, esters and aromatic hydrocarbons, such as methyl ethyl ketone, cyclohexanone, ethylacetate, toluene, etc.

The invention also includes a process for applying the above composition as a coating to objects to be submerged in sea water and the coating thereby obtained.

DETAILED DESCRIPTION

In the anti-fouling paint composition of the invention, the isocyanate compound may have 1-3 isocyanate groups therein and the hydroxy-containing compound may have an appropriate number of hydroxy groups to give 1-3 urethane groups in the reaction product. When a polyisocyanate is used such as a di- or tri-isocyanate the hydroxy-containing compound advantageously has one hydroxy group therein such as listed above. However, when the isocyanate compound has one isocyanate group the hydroxy-containing compound may have two or three hydroxy groups therein such as glycols, e.g. ethylene glycol, propylene glycol, hexylene glycol, dimethylol and diethylol benzene, etc., and trihydroxy compounds such as glycerine, trimethylol propane, trihydroxy hexane, etc.

The solvent portion of the composition in which the low molecular weight hydroxy-containing component is contained, may also contain other non-hydroxy volatile components such as ketones, esters and hydrocarbons. These may be all of one type or may be mixtures of two or more types, and may comprise methylethylketone, diethylketone, acetone, methylpropyl ketone, benzylmethyl ketone, acetophenone, butyrophenone, 3-hexanone, cyclohexanone, ethylene glycol diacetate, ethyl acetate, butyl acetate, amyl acetate, toluene, xylene, dimethylether of ethylene glycol, diethyl ether of ethylene glycol and other low molecular weight, volatile solvents non-reactive with isocyanates, advantageously containing less than 10, preferably no more than 7 carbon atoms, such as ethylacetate, butylacetate, toluene, xylene, etc.

An important aspect of this invention is that these compositions have both hydrophilic and hydrophobic components therein. The hydrophilic component aids in adherence of the composition to the material on which it is applied. The hydrophobic component aids in making the composition retardant to the solvent effect of water or in other words, less leachable.

For the purpose of this invention it has been found that suitable hydrophilic components are castor oil, partially hydrolyzed polyvinyl acetate, partially hydrolyzed copolymers of vinyl chloride and vinyl acetate, hydroxy-containing polyacrylates or methacrylates such as polymers or copolymers of 2-hydroxyethyl methacrylate, etc., and polymers of monovinyl and mono-alphaalkylvinyl ethers of alkylene glycols, such as ethylene glycol, diethylene glycol, propylene glycol, dipropylene glycol, butylene glycol, etc.

Particularly suitable as hydrophobic components are the urethane derivatives prepared by the reaction of an isocyanate, that is a monoisocyanate, triisocyanate or preferably a diisocyanate with a low molecular weight alcohol, such as ethanol, propanol, butanol, etc. or with a low molecular weight monoether or monoester of an alkylene glycol such as ethylene glycol, propylene glycol, butylene glycol, etc. The monoether portion may be ethyl, propyl, butyl, hexyl, phenyl, phenylethyl, cyclohexyl, etc. and the monoester portion may be aceto, propyro, butyro, benzo, phenylaceto, cyclohexylaceto, etc. Preferably the monoether and monoester portions contain no more than 8, preferably no more than 4, carbon atoms and the alkylene glycol portion contains 2-6 carbon atoms. Typical monoalkyl glycol ethers that may be used include monomethyl ether of ethylene glycol, monoethyl ether of ethylene glycol, monoethyl ether of propylene glycol, monopropyl ether of butylene glycol, monophenyl ether of ethylene glycol, monocyclohexyl ether of ethylene glycol, etc. Typical monoesters of alkylene glycols include monoacetate ester of ethylene glycol, monoprionate ester of propylene glycol, monoacetate ester of hexylene glycol, mono(cyclohexylacetate) of propylene glycl, monobenzoate ester of ethylene glycol, etc.

The isocyanates that may be used may be represented by the formula $Q(NCO)_n$ wherein n is an integer having a value of 1, 2 or 3 and Q is an aliphatic, cycloaliphatic or aromatic hydrocarbon nucleus having 5-8 carbon atoms and a valency equivalent to the value of n. Typical isocyanates that may be used include hexamethylene diisocyanate, pentamethylene diisocyanate, octamethylene diisocyanate, phenylenediisocyanate, tolylenediisocyanate, xylenediisocyanate, diphenylenediisocyanate, trisocyanatobenzene, triisocyanatodiphenyl, phenyl isocyanate, tolyl isocyanate, hexyl isocyanate, etc.

The hydroxyl compound may be represented by the formula $R''(OH)_{n'}$, wherein the R'' represents an aliphatic, cycloaliphatic or arylaliphatic hydrocarbon radical of 1-10 carbon atoms, preferably 2-6, n' is an integer having a value of 1, 2, or 3, provided that the sum of n and n' does not exceed 3. The hydroxyl compound may also be a monoether or monoester of an alkylene glycol as described above in which there are a total of 4-12, preferably 4-10 carbon atoms.

The reaction of a mono-hydroxyl compound with an isocyanate may be represented as follows:

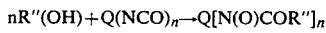

wherein Q is an organo group, preferably hydrocarbyl, having a valency corresponding to the number of NCO groups.

The reaction of a di- or tri-hydroxyl compound with a mono-isocyanate may be represented as:

It appears that while some of the isocyanate groups may react with some of the hydroxy groups of the hydrophilic component, the reaction is more rapid and preferential with the low molecular weight alcohols or the monohydroxy ethers and esters described above. If this were not the case, the increase in molecular weight of the hydrophilic material would make the composition completely unleachable with the result that the tin-containing component would not be able to exert its toxic effect. It is preferred therefore that the isocyanate reaction is predominantly with the lower molecular weight hydroxy compounds so that hydrophobic urethane groups are produced without the undesired effect described above.

In compositions of this invention on the solids basis the proportions of components are advantageously 50-75 percent by weight preferably 65-75 percent by weight, of the polymeric tin-containing component; 19-38 percent by weight, preferably 18-30 percent by weight of the castor oil, partially hydrolyzed polyvinyl acetate or other hydrophilic component; 6-12 percent by weight, preferably 6-8 percent by weight of the hydrophobic urethane component.

On a solids basis the tin content is advantageously at least 1.5 percent by weight, preferably at least 2.5 percent by weight. It is impractical to exceed 10 percent, preferably no more than 5 percent by weight tin based on the solids content.

The partially hydrolyzed vinyl acetate homopolymers and vinyl acetate-vinyl chloride copolymers advantageously have molecular weights in the range of 8,000-35,000, preferably 20,000-23,000. The polymers of vinyl and alpha-alkylvinyl ethers of alkylene glycols (including dialkylene glycols) advantageously are in the range of 2,000-10,000, preferably 4,000-8,000. The hydroxy-containing polyacrylates and polymethacrylates are advantageously in the molecular weight range of 80,000-120,000, preferably 90,000-110,000. In the partially hydrolyzed vinyl acetate polymers (including copolymers), the hydrolysis is advantageously in the range of 5-30% hydrolyzed, preferably 10-25% hydrolyzed.

In the suspended paint compositions there is advantageously 40-67 percent by weight, preferably 50-65 percent by weight of solvent in which there is 10-30 percent preferably 15-20 percent by weight of the hydroxy-containing solvent component based on the solvent proportion or 7-10 percent by weight based on the total composition. The maximum amount of hydroxyl-containing solvent component is determined by compatibility with the other components.

The film-forming or paint composition advantageously contains (a) 10-22 percent by weight of hydrophilic component, preferably 10.5-16% by weight; (b) 2.5-7.5 percent by weight of hydrophobic component, preferably 3.5-6 percent by weight; (c) 30-55 percent by weight of tin polymer, preferably 40-50 percent by weight; and (d) 20-40 percent by weight of solvent, preferably 30-38 percent. The solids content is advantageously in the range of about 25-40 percent by weight, preferably 30-35 percent by weight.

While as little as 1% by weight of tin in the tin-containing resin has some anti-fouling effect in the ultimate coating it is generally advantageous to have at least 2% and preferably at least 3% tin in the tin-containing resin. Contents of more than 20% tin are impractical since the increased amounts add more expense without adding proportionate increase in effectiveness. Therefore it is generally preferred to have no more than 10% tin in the tin-containing resin.

After the composition is applied on a surface the unreacted solvent components, including the unreacted hydroxyl-containing components, evaporate to leave a hardened film containing the tin-containing polymer and the hydrophilic and hydrophobic components described above. As the surface of the composition is very slowly leached, the tin component is exposed so as to exert its toxic effect. This is prolonged by the slowed-down leaching rate.

The polymeric tin component may be the reaction product of any organic polymer containing free —COOH or carboxylic acid groups with either $R_3SnOH$ or $R_3SnOSnR_3$ wherein R may be a lower alkyl (including cycloalkyl and aralkyl) or aryl radical. Such "lower" radicals include 1–10 carbon atoms. Advantageously the COOH-containing polymers have a molecular weight in the range of 75,000–125,000 and preferably 90,000–110,000.

The radical R may be a lower alkyl radical. Lower alkyl radicals may be those containing less than about ten carbon atoms and may include the ethyl, n-propyl, isopropyl, n-butyl, sec-butyl, tert-butyl, n-butyl, amyl, hexyl, octyl, nonyl, isooctyl, etc. radicals and cyclized lower alkyl radicals such as the cyclohexyl or the methylcyclohexyl or other cycloalkyl radicals of 5–10 carbon atoms and aralkyl radicals of 6–10 carbon atoms such as benzyl, phenethyl, etc. R may also be an inertly substituted lower alkyl radical. When R is an alkyl radical of 2–4 carbon atoms, e.g. an ethyl, propyl, or butyl radical, the greatest activity may be obtained. All the R radicals need not be the same. It is preferred that when R is an alkyl radical the total number of carbon atoms in the three R radicals be in the range of 6–12 and most preferably 9–12.

The radical R may also be an aryl radical, including phenyl and inertly substituted aryl radicals. Inert substituents may include chloride, bromide, oxyhydrocarbyl, alkyl, etc. substituents and R may typically be chlorophenyl, bromophenyl, nitrophenyl, methoxy, ethoxy, tolyl, xylyl, ethylphenyl, etc. Preferably, when R is an aryl radical, including inertly substituted aryl radicals, each R group may contain 6–10 carbon atoms and more preferably the aryl group may be an unsubstituted phenyl radical.

The carboxyl-containing polymeric material may be any polymeric material obtained by either condensation or addition polymerization having free carboxylic acid groups therein, or groups such as carboxylate ester groups which have been hydrolyzed to give free carboxylic acid groups. The free carboxylic acid groups may then be reacted with $R_3SnOH$ or $(R_3Sn)_2O$ to attach $R_3SnO-$ radicals to the polymeric material.

Particularly suitable COOH-containing polymeric materials are those shown in U.S. Pat. Nos. 3,684,752, 3,979,354 and 4,082,709. These same patents also show the production of tin-containing polymeric materials from such COOH-containing polymers.

As shown in U.S. Pat. No. 3,684,752, (a) alkyd resins having free carboxyl acid groups in the polymeric molecules may be used, preferably those having a resin acid value larger than 20. With such acid values there may be at least 5% by weight of the organo-tin component introduced into the polymeric material. The alkyd resins are prepared from polycarboxylic acids or their anhydrides such as phthalic anhydride, isophthalic acid, maleic anhydride, etc. by reaction with polyhydric materials such as glycerine, ethylene glycol, trimethylol ethane, pentaerythritol, with or without monocarboxylic materials present such as linseed oil fatty acid, soybean oil fatty acid, dehydrated castor oil fatty acid, linoeic fatty acid, oleic fatty acid, etc.

Other COOH-containing polymeric materials suitable for the introduction of $R_3SnO$ components are the vinyl polymers and epoxy polymers shown by U.S. Pat. Nos. 3,979,354 and 4,082,709. The carboxylic acid-containing polymers may be prepared by (b) the polymerization (including copolymerization) of vinyl monomers containing carboxylic acid groups such as acrylic, methacrylic, maleic acids, etc.; (c) the hydrolysis of polymers of vinyl monomers containing esters of carboxylic acid, such as acrylates, methacrylates, maleates, etc., and (d) epoxy resins formed with or cured by crosslinking agents containing carboxylic acid groups, for example, resins from glycidyl ether compositions cured with acrylic and methacrylic acids.

The COOH-containing polymers of group (b) may be produced by polymerizing monomers of the formula R'COOH wherein R' represents an organic group containing a polymerizable ethylenic group preferably vinyl, alphamethylvinyl, other alpha lower alkyl vinyl groups, vinylaryl radicals, beta-carboxylic groups, etc. Typical monomers which are useful include, but are not limited to, acrylic acid, methacrylic acid, ethacrylic acid, alpha-phenyl acrylic acid, chloroacrylic acid, vinyl benzoic acid, alphabenzyl acrylic acid, maleic anhydride, monomethyl maleate, fumaric acid, monoethyl furmarate, etc. With the maleic anhydride, maleates and fumarates it is desirable to use a comonomer such as styrene, methyl vinyl ether, acrylic acid, methacrylic acid, etc. Moreover, the respective esters of the above monomers may also be used and subsequent to polymerization all or some of the ester groups hydrolyzed to give the free carboxylic acids.

Comonomers that may be used with the above monomers include other vinyl monomers such as vinyl chloride, styrene, p-chlorostyrene, vinyl acetate, vinyl butyrate, etc. They may also include acrylic monomers such as methyl acrylate, methyl methacrylate, ethyl acrylate, acrylic acid, methacrylamide, methacrylic acid, acrylamide, acrylonitrile, etc.

These COOH-containing or convertible polymers may be prepared by various techniques of free radical polymerization. Thus, the polymerizations may be carried out in bulk, in solution, in emulsion, in suspension, etc. Polymerization may be initiated by various suitable free radical initiators including benzoyl peroxide, di-t-butyl peroxide, lauroyl peroxide, cumene hydroperoxide, azo-bis-isobutyronitrile, methyl ethyl ketone peroxide, persulfate-bisulfite redox catalysts, persulfate-mercaptan redox catalysts and the like. The polymerizations may be carried out at any suitable temperature, depending upon the catalyst system employed, but temperatures in the range of 40°–90° C. are preferred. Polymerization temperatures in this range afford a good balance between rate of polymerization, yield of polymer, molecular weight of polymer and time of reaction. Various polymerization control agents such as accelerators, chain-transfer agents, surface active agents, suspending agents and the like may also be employed if desired.

In preferred modifications of this invention the antifouling coating compositions contain about 10–21% of the hydrophilic component, namely castor oil having a hydroxyl equivalent weight of 800–1,000, or a partially hydrolyzed vinyl ester, e.g. polyvinyl acetate, propionate, benzoate, etc., or vinyl ester copolymer with vinyl chloride, etc., to give 2.0–2.3 hydroxyl groups per molecule of polymer or a hydroxyl equivalent weight of 800–1,000; about 25–35% of a non-hydroxy solvent, such as a low molecular weight ketone, a low molecular weight ester or an aromatic hydrocarbon solvent having a kauri butanol value of 73–105; about 7–8.5, preferably 7.5–8.2% of hydroxy-containing solvent such as low molecular weight alcohol, e.g. 1–5 carbon alkanol or 3–8 carbon ether alcohol such as ethylene glycol monobutyl ether, etc.; about 1.5–5%, preferably 2–5.3% of an isocyanate, preferably a diisocyanate; and 30–50% of biocidal tin polymer based on total composition so as to give 50–75%, preferably 65–75% based on weight of solids. For brush application the paint composition also contains 1–2% of a flow aid such as cellulose butyrate acetate, etc. Preferred diisocyanates are toluene diisocyanate, diphenylmethane diisocyanate, diisodecyl diisocyanate, hexamethylene diisocyanate, isophorone diisocyanate. These preferably have an equivalent weight of 180–405 based on the NCO content.

The various components of the compositions are mixed by any convenient means and in any appropriate vessel such as a stainless steel vessel preferably equipped with a stirring means.

The components may be added in any desired sequence except that the solvent mixture or at least the hydroxy-containing components of the solvent mixture should be present before the isocyanate is brought into contact with either the hydroxy-containing hydrophilic component or the Sn-containing polymer.

Mixing may be effected at room temperature or at any temperature in the range of 60°–105° C. (15.5°–40.5° C.), or preferably 70°–90° F. (21°–32° C.). Atmospheric pressure is satisfactory although a closed container with a slight pressure may be desirable where volatile solvents are used.

SPECIFIC EMBODIMENTS OF THE INVENTION

The invention is illustrated by the following examples which are intended merely for purposes of illustration and are not to be regarded as limiting the scope of the invention or the manner in which it may be practiced. Unless specifically indicated otherwise, parts and percentages are given by weight.

EXAMPLE I

Three hundred and eighty-seven parts of phthalic anhydride, 337 parts of trimethylol ethane, 345 parts of linseed oil fatty acid and 50 parts of xylene are charged into a closed alkyd resin manufacturing apparatus provided with a thermometer, agitator and a device for removing condensation water, heated gradually with agitation and reacted for 5 hours at 230° C., the condensation water which forms is removed from the reaction system together with xylene vapor and reaction continued until the resin acid value is below 10 to complete the first stage of esterification. Next the content of the reactor is cooled to 180° C., 152 parts of phthalic anhydride and 230 parts of xylene is added and further reacted for 1 hour at a temperature of 155° C. to carry out the second stage of esterification and diluted by adding 488 parts of xylene, by which alkyd resin with 60% solids and resin acid value of 60 is obtained (corresponds to 1.23 carboxyl groups). To this is added 365 parts of bis(tributyl tin)oxide (0.615 mol) and 244 parts of xylene, reacting under reflux for 4 hours at 140°–143° C. while removing water, 10 parts of condensation water is removed from the condensed alkyd resin and bis(tributyl tin)oxide almost quantitatively, and as a result, high molecular weight organic tin compound A of 60 percent solids is obtained which is transparent and fluid. The tin content of this compound A is 9.65 percent.

EXAMPLE II

Five hundred and thirty-nine parts of phthalic anhydride, 337 parts of trimethylol ethane, 345 parts of soybean oil fatty acid and 50 parts of xylene are charged into the same reactor as in Example I, heated slowly, reacted for 5 hours at 230° C. until the resin acid value becomes 60 (1.23 mol), cooled, 365 parts of bis(tributyl tin)oxide (0.615 mol) and 750 parts of xylene are added and condensation of alkyd resin and bis(tributyl tin)oxide carried out in a similar manner as in Example I, by which high molecular weight organic tin compound B of 65 percent solids content is obtained which is transparent and fluid. The tin content of this compound is 9.65 percent.

EXAMPLE III

Using the procedure of Example I, 344 parts of phthalic anhydride, 271 parts of trimethylol ethane, 309 parts of linseed oil fatty acid, 122 parts of Carbowax Polyethylene Glycol 1000 (product of Union Carbide Corporation, molecular weight 950–1,050), 17 parts of pentaerythritol and 50 parts of xylene are reacted for 5 hours at 230° C., 152 parts of phthalic anhydride and 230 parts of xylene are added, further reacted for 1 hour at 155° C. to prepare an alkyd resin solution with a resin acid value of 60 (corresponds to 1.23 carboxyl groups) and diluted by adding 487 parts of xylene. Next, 189 parts of bis(tributyl tin)oxide (0.318 mol) and 113 parts of xylene are added and reacted for 4 hours at 140°–143° C., by which high molecular weight organic tin compound C of 60 percent solids content is obtained, which is transparent and fluid. The tin content of this compound C is 5.66 percent.

EXAMPLE IV

Using the procedure of Example I, 268 parts of phthalic anhydride, 248 parts of pentaerythritol, 596 parts of linseed oil fatty acid and 50 parts of xylene are reacted for 5 hours at 230° C., 152 parts of phthalic anhydride and 230 parts of xylene are added, further reacted for 1 hour at 155° C. to prepare an alkyd resin solution with a resin acid value of 60 (corresponds to 1.23 carboxyl groups) and this resin solution is diluted by adding 487 parts of xylene. Then 189 parts of bis(tributyl tin)oxide (0.318 mol) of bis(tributyl tin)oxide and 113 parts of xylene are added and reacted for 4 hours at 140°–143° C., by which high molecular weight organic tin compound D of 60 percent solids content is obtained, which is fluid. The tin content of this compound D is 5.66 percent.

EXAMPLE V

Three hundred and fourteen parts of bis(tripropyl tin) oxide (0.615 mol) is used in place of bis(tributyl tin) oxide in Example I and 293 parts of xylene is added followed by reaction for 4 hours at 140°–143° C. under reflux and while removing water, by which 10 parts of condensation water is removed and high molecular weight organic tin compound E of 60 percent solids content is obtained by condensation of the alkyd resin and bis(tripropyl tin) oxide, which product is transparent and fluid. The tin content of this compound E is 8.61 percent.

EXAMPLE VI

Using the procedure of Example I, 573 parts (tri-n-octyl tin) oxide (0.615 mol) in place of the bis(tributyl tin) oxide of Example I and 362 parts of xylene are reacted for 4 hours at 140°–143° C. under reflux and while removing water, by which 10 parts of condensation water is removed and high molecular organic tin compound F of 60 percent solids content is obtained by condensation of the alkyd resin and bis(tri-n-octyl tin) oxide which product is transparent and fluid. The tin content of this compound F is 8.51 percent.

EXAMPLE VII

Using the procedure of Example I, 311 parts of phthalic anhydride, 372 parts of trimethylol ethane, 381 parts of dehydrated castor oil fatty acid and 50 parts of xylene are reacted for 5 hours at 230° C., and 460 parts of phthalic anhydride and 230 parts of xylene are added and further reacted for 1 hour at 155° C. to prepare an alkyd resin solution with resin acid value of 120 (corresponds to 3.12 carboxyl groups) and diluted by adding 410 parts of xylene. Next, 446 parts of bis(tributyl tin) oxide (0.75 mol) and 100 parts of xylene are added to the diluted alkyd resin solution, and condensation carried out for 4 hours at 140°-143° C., by which high molecular weight organic tin compound G of 70 percent solids content is obtained, which product is transparent and fluid. The tin content of this compound G is 9.41 percent.

EXAMPLE VIII

Using the procedure of Example I, 208 parts of isophthalic acid, 426 parts of pentaerythritol, 439 parts of linseed oil fatty acid and 50 parts of xylene are reacted for 5 hours at 230° C. Then 1,117 parts of phthalic anhydride and 1,361 parts of xylene are added and further reacted for 1 hour at 155° C. to prepare a 60 percent alkyd resin solution having an acid value of 200 (corresponds to 7.547 carboxyl groups), 2,241 parts of bis(tributyl tin) oxide (3.7735 mols) and 1,450 parts of xylene are added to this diluted resin solution and reacted for 4 hours at 140°-143° C., by which high molecular weight tin compound H of 60 percent solids content is obtained, which is transparent and fluid. The tin content of this compound H is 20.81 percent.

EXAMPLE IX

Using the procedure of Example I, 344 parts of phthalic anhydride, 271 parts of trimethylol ethane, 309 parts of linseed oil fatty acid, 122 parts of Carbowax Polyethylene Glycol 1,000 (the same as that used in Example III), 17 parts of pentaerythritol and 50 parts of xylene are reacted for 5 hours at 230° C. Then 152 parts of phthalic anhydride and 230 parts of xylene are added and further reacted for 1 hour at 155° C. to prepare an alkyd resin solution with a resin acid value of 60 (corresponds to 1.23 carboxyl groups) and then this resin solution is diluted by adding 487 parts of xylene. Next, 293 parts of bis(tributyl tin) oxide (0.493 mol) and 113 parts of xylene are added to this and further reacted for 4 hours at 140°-143° C., by which high molecular weight organic tin compound I of 62 percent solids content is obtained, which is transparent and fluid. The tin content of this compound I is 8.13 percent.

EXAMPLE X

Using the procedure of Example I, 344 parts of phthalic anhydride, 271 parts of trimethylol ethanol, 309 parts of linseed oil fatty acid, 122 parts of Carbowax Polyethylene Glycol 1,000 (the same as that used in Example III), 17 parts of pentaerythritol and 50 parts of xylene are reacted for 5 hours at 230° C. Then 152 parts of phthalic anhydride and 230 parts of xylene are added further and reacted for 1 hour at 155° C. to prepare an alkyd resin with a resin acid value of 60 (corresponds to 1.23 carboxyl groups) and then this resin solution is diluted by adding 487 parts of xylene. Next, 365 parts of bis(tributyl tin) oxide (corresponds to 0.615 mol as bis(tributyl tin) oxide) and 113 parts of xylene are added to this and reacted for 4 hours at 104°-143° C., by which high molecular weight organic tin compound J of 63 percent solids content was obtained which product is transparent and fluid. The tin content of this compound J is 9.65 percent.

EXAMPLE XI

Using the procedure of Example I, 387 parts of phthalic anhydride, 337 parts of trimethylol ethane, 345 parts of fatty acid (its composition is 4 percent saturated fatty acid, 8 percent oleic acid, 47 percent conjugated linolic acid and 41 percent non-conjugated linoleic acid) and 50 parts of xylene are reacted for 8 hours at 220° C. to make an acid value of about 10. Then 41 parts of phthalic anhydride and 210 parts of xylene are added and further reacted for 1 hour more at 155° C. An 8 percent alkyd resin solution with resin acid value of 25 is prepared, 138 parts of bis(tributyl tin) oxide and 30 parts of xylene are added, reacted at 140°-143° C., with about 4 parts of condensation water removed and then diluted with 489 parts of xylene, by which high molecular weight organic tin compound K of 61 percent solids content is obtained, which product is transparent and fluid. The tin content of this compound K is 4.67 percent.

EXAMPLE XII

Using the procedure of Example I, 387 parts of phthalic anhydride, 337 parts of trimethylol ethane, 345 parts of fatty acid (the same as that used in Example XI), and 50 parts of xylene are reacted for 6 hours at 230° C. Then 86 parts of phthalic anhydride and 222 parts of xylene are added and further reacted for 1 hour at 153° C. to prepare 80 percent alkyd resin solution with a resin acid value at 40. The 230 parts of bis(tributyl tin) oxide and 55 parts of xylene and added and further reacted for 4 hours at 140°-143° C. with 7 parts of condensation water removed and then diluted with 543 parts of xylene, by which high molecular weight organic tin compound L of 60 percent solids content is obtained, which product is transparent and fluid. The tin content of this compound L is 7.02 percent.

EXAMPLE XIII

Using the procedure of Example I, 344 parts of phthalic anhydride, 271 parts of trimethylol ethane, 309 parts of linseed oil fatty acid, 122 parts of Carbowax Polyethylene Glycol 1,000 (the same as that used in Example III), 17 parts of pentaerythritol and 50 parts of xylene are reacted for 5 hours at 230° C. Then 152 parts of phthalic anhydride and 280 parts of xylene are added and further reacted for 1 hour more at 155° C. to prepare an alkyd resin solution with resin acid value of 60 (corresponds to 1.23 carboxyl groups) and this resin solution is diluted by adding 487 parts of bis(triphenyl tin)oxide (0.615 mol) and 113 parts of xylene are added and reacted for 4 hours at 140°-143° C. to obtain high molecular weight organic tin compound M of 63 percent solids content, which is transparent and fluid. The tin content of this compound M is 9.23 percent.

EXAMPLE XIV

Reaction of Tri-n-butyl Oxide With Polyacrylic Acid

The reaction is carried out in a 1 liter, 3 necked flask, provided with an azeotropic distillation head connected to a reflux condenser, a thermometer positioned such that it reads the temperature of the reaction solution, and a stopper. The reaction solution is stirred by means of a magnetic stirrer. In the reaction flask, polyacrylic acid (24 grams, 0.333 mole) is added to a solution of tri-n-butyltin oxide (84.8 ml, 0.167 mole) and dichloromethane (250 ml). The reaction is refluxed for 2 hours, at the end of which 3 ml of water is formed and collected by azeotropic distillation. The resultant clear organometallic polymer (P-1) is cast in a film from the dichloromethane solution. Analysis shows 32.68% Sn which compares favorably with the value of 33% calculated on atomic absorption spectroscopy.

EXAMPLE XV

Reaction of Tri-n-propyltin Oxide With Polyacrylic Acid

The procedure of Example XIV is used except that tri-n-propyl-tin oxide (68.2 ml, 0.167 mole) is the organometallic and benzene is the solvent. Three ml of water are formed by this reaction. The product polymer (P-2) is again clear and is cast as a film from the benzene solution. Analysis shows 36.52% Sn which compares favorably with 37% calculated.

EXAMPLE XVI

Reaction of Tri-n-butyltin Oxide and Tri-n-propyltin Oxide With Polyacrylic Acid The procedure of Example XIV is used with equimolar quantities of tri-n-butyltin oxide (42.2 ml, 0.083 mole) and tri-n-propyl-tin oxide (33.9 ml, 0.083 mole) reacted with polyacrylic acid in benzene to give a polymer with alternating organometallic groups. After 3 hours of refluxing, 3 ml of water are collected azeotropically. This clear polymer (P-2) is cast as a film from the benzene solution.

EXAMPLE XVII

Reaction of Tri-n-butyltin Oxide With Polymethacrylic Acid

The procedure of Example XIV is used with a polymethacrylic acid (28.8 grams, 0.167 mole) and tri-n-butyltin oxide (42.2 ml, 0.083 mole) in toluene (300 ml). After the reaction has run for 3 hours, 16.2 ml of water are formed. The reaction mixture is filtered, and the isolated white powdery product (P-4) is then washed with toluene. Analysis of 37.77% Sn compares favorably with the calculated value of 32%.

EXAMPLE XVIII

Reaction of Trimethyltin Hydroxide With Polyacrylic Acid

The procedure of example XIV is used except that 60 grams of trimethyltin hydroxide (0.333 mole) is used and the solvent is benzene (300 ml). The reaction is terminated at the end of 2½ hours. Five ml of water are produced by this synthesis. The white powdery polymer product (P-5) is isolated by filtering and washing the reaction mixture with benzene. The analysis of 28.4% Sn compares with the calculated value of 51%.

EXAMPLE XIX

Reaction of trimethyltin Hydroxide With Polymethacrylic Acid

Polymer P-6 is prepared by the reaction of polymethacrylic acid (28.8 grams, 0.167 mole) and trimethyltin hydroxide (30 grams, 0.167 mole) in toluene (300 ml). After 19 hours the reaction is terminated and 16.1 ml of water are collected. The reaction mixture is filtered and washed with toluene. The resulting polymer product consists of a cream-colored, granular material.

EXAMPLE XX

Reaction of Tribenzyltin Hydroxide with Polyacrylic Acid

The procedure of Example XIV is repeated to prepare polymer P-7 except that tribenzyltin hydroxide (68.19 grams, 0.167 mole) is the organometallic and benzene (300 ml) is the solvent. After running the reaction for 2 hours, 2.5 ml of water are formed. After the solvent evaporates, a clear product polymer (P-7) remains which is in the form of a film. Analysis of 23.32% Sn compares favorably with the calculated value of 26%.

EXAMPLE XXI

Reaction of Triphenyltin With Polyacrylic Acid

The procedure of Example XIV is used to react triphenyltin hydroxide (100.2 grams, 0.273 mole) with an equimolar quantity of polyacrylic acid (19.65 grams, 0.273 mole) and benzene (400 ml). The reaction runs for 2 hours, at the end of which 4.9 ml of water has been collected azeotropically. Polymer P-8 is isolated as a cream-colored powder. Analysis of 31.34% Sn compares with a calculated value of 29%.

EXAMPLE XXII

Reaction of Tri-n-butyltin Oxide With Copolymer of Methylvinyl Ether and Maleic Acid The preparation of P-9 is carried out in a 1 liter, 3 necked flask provided with a mechanical stirrer, an azeotropic distillation head connected to a reflux condenser, and a thermometer positioned such that it reads the temperature of the reaction solution. The poly(-methyl vinyl ethermaleic acid) (equimolar) (29.0 grams, 0.167 mole) is added to the reaction flask, which already contains benzene (300 ml) and tri-n-butyltin oxide (84.4 ml, 0.167 mole). At the end of 3 hours, 6 ml of water is collected azeotropically. Polymer P-9 is a yellow transparent product which can be cast as a film from the benzene solution. Analysis of 30.80% Sn compares favorably with the calculated value of 32%.

The various components of the compositions are mixed by any conventional means and in any appropriate vessel such as a stainless steel vessel preferably equipped with a stirring means.

The components may be added in any desired sequence except that the solvent mixture or at least the hydroxy-containing components of the solvent mixture should be present before the isocyanate is brought into contact with ether the hydroxy-containing hydrophilic component or the Sn-containing polymer.

Mixing may be effected at room temperature or at any temperature in the range of 60°–105° F. (15.5°–40.5° C.), or preferably 70°–90° F. (21°–32° C.). Atmospheric pressure is satisfactory although a closed container with a slight pressure may be desirable where volatile solvents are used.

EXAMPLE XXIII

Reaction of Tri-n-propyltin Oxide with Copolymer of Methylvinyl Ether and Maleic Acid (Tin Polymer P-10).

Polymer P-10 is prepared by the reaction as in the procedure of Example XXII of a copolymer of equimolar portions of methylvinyl ether and maleic acid (29.0 grams, 0.167 mole) with tri-n-propyltin oxide (67.8 ml, 0.167 mole). From azeotropic distillation, 6.9 ml of water is collected. The polymer product is a yellow, transparent polymer that can be cast as a film from the benzene solution. Analysis shows 34.86% Sn which compares favorably with the calculated value of 36%.

EXAMPLE XXIV

Preparation of Anti-Fouling Paint Using Alkyd Tin Polymer A

In a stainless steel mixing vessel equipped with stirring means there are added in the given order and in the amounts indicated the following ingredients:
15 gms. Castor Oil
15 gms. Methylethyl ketone
3.9 gms. Ethanol
3.9 gms. n-Butylmonoether of ethylene glycol
7.8 gms. Toluene
7.8 gms. Ethyl acetate
3.6 gms. Toluene diisocyanate
43 gms. Alkyd tin polymer A
The resulting mixture is stirred at 70°–90° F. for about 30 minutes. A liquid product is obtained which has a shelf life of more than a year. When applied to test panels, it produces tough, hard films which when immersed in sea water shows no sign of fouling after extended periods.

EXAMPLE XXV

Preparation of Anti-Fouling Paints Using a Variety of Tin Polymers

The procedure of Example XXIV is repeated with similar good anti-fouling results using in place of the Tin Polymer A equal weights respectively of:
(a) Alkyd Tin Polymer B
(b) Alkyd Tin Polymer C
(c) Alkyd Tin Polymer D
(d) Alkyd Tin Polymer E
(e) Alkyd Tin Polymer F
(f) Alkyd Tin Polymer G
(g) Alkyd Tin Polymer H
(h) Alkyd Tin Polymer I
(i) Alkyd Tin Polymer J
(j) Alkyd Tin Polymer K
(k) Alkyd Tin Polymer L
(l) Alkyd Tin Polymer M
(m) Tin Carboxylate Polymer P1
(n) Tin Carboxylate Polymer P2
(o) Tin Carboxylate Polymer P3
(p) Tin Carboxylate Polymer P3
(q) Tin Carboxylate Polymer P4
(r) Tin Carboxylate Polymer P5
(s) Tin Carboxylate Polymer P6
(t) Tin carboxylate Polymer P7
(u) Tin Carboxylate Polymer P8
(s) Tin Carboxylate Polymer P9
(t) Tin Carboxylate Polymer P10

EXAMPLE XXVI

Preparation of Anti-Fouling Paints Using a Variety of Hydrophilic Components

The procedure of Example XXV is repeated a number of times with similar anti-fouling results using in place of the castor oil equal weights respectively of:
(a) Poly(2-hydroxyethyl methacrylate) with average hydroxyl equivalent weight of 525.
(b) Poly(2-hydroxypropyl acrylate) with average hydroxyl equivalent weight of 530.
(c) Partially hydrolyzed polyvinyl acetate having an average molecular weight of 20,000 and an average hydroxyl equivalent weight of 1700.
(d) Partially hydrolyzed 50—50 vinyl acetate-vinyl chloride copolymer having an average molecular weight of 22,000 and an average hydroxyl equivalent weight of 600.
(e) Poly(methylvinyl ether of diethylene glycol) having a molecular weight of 5,000 and an average hydroxyl equivalent weight of 610.

EXAMPLE XXVII

In a stainless steel mixing vessel equipped with stirring means there are added in the given order and in the amounts indicated the following ingredients:

| Ingredient | PARTS BY WEIGHT | | | | | |
|---|---|---|---|---|---|---|
| | 1 | 2 | 3 | 4 | 5 | 6 |
| Poly(2-OH—ethyl methacrylate)* | 10.00 | 12.50 | 14.80 | 16.20 | 18.83 | 19.98 |
| Methylethyl ketone | 15.00 | 15.20 | 15.60 | 15.82 | 15.85 | 16.35 |
| Ethyl alcohol | 3.70 | 3.75 | 3.83 | 3.92 | 4.01 | 4.12 |
| n-Butyl monoether of ethylene glycol | 3.70 | 3.75 | 3.87 | 3.98 | 4.03 | 4.14 |
| Toluene | 7.25 | 7.30 | 7.72 | 7.84 | 8.04 | 8.26 |
| Ethyl acetate | 7.25 | 7.30 | 7.78 | 7.92 | 8.06 | 8.35 |
| Toluene diisocyanate | 2.67 | 3.10 | 3.60 | 4.31 | 4.90 | 5.24 |
| Tin Carboxylate Polymer P-1 | 50.00 | 47.10 | 42.80 | 40.01 | 36.28 | 33.57 |

The solids content in each of the above mixtures is about 33 percent. The respective mixtures are stirred at 70°–90° F. for about 30 minutes. In each case a clear liquid product is obtained which has a shelf life of more than a year. When applied to test panels they produce tough, hard films which when immersed in sea water show no sign of fouling after extended periods.

EXAMPLE XXVIII

The procedure of Example XXVII is repeated using each time in place of the poly(2-OH-ethyl methacrylate) the same amount of a partially hydrolyzed polyvinylacetate having a hydroxy equivalent weight of about 900. Similar results are obtained with respect to producing tough films which have very good resistance over extended periods to fouling in sea water.

EXAMPLE XXIX

The procedure of Example XXVII is repeated using each time in place of the poly(2-OH-ethyl methacrylate) the same amount of a partially hydrolyzed polyvinyl chloride-acetate copolymer having a hydroxy equivalent weight of about 800. Tough films are likewise produced which have very good resistance over extended periods against fouling in sea water.

EXAMPLE XXX

The procedure of Example XXVII is repeated using each time in place of the poly(2-OH-ethyl methacrylate) the same amount of a partially dehydrated castor oil having a hydroxyl equivalent weight of about 600. Tough, hard films are produced which show very good resistance over extended periods against fouling in sea water.

EXAMPLE XXXI

The procedure of Example XXVII is repeated using each time in place of the ethanol an equal amount of isopropanol, in place of the n-butylmonoether of ethylene glycol an equal amount of the n-propyl monoether of propylene glycol and in place of the toluene an equal amount of xylene. Similar results are obtained as in Example XXVII.

EXAMPLE XXXII

The procedure of Example XXVII is repeated using each time in place of the ethanol an equal amount of methanol, in place of the n-butyl monoether of ethylene glycol an equal amount of the monoacetate ester of ethylene glycol and in place of the toluene an equal amount of benzene. Similar results are obtained as in Example XXVII.

EXAMPLE XXXIII

The procedure of Example XXVII is repeated using each time in place of the toluene diisocyanate an equal amount of hexamethylene diisocyanate, in place of the monobutylether of ethylene glycol an equal amount of the monoethylether of propylene glycol, in place of the methylethylketone an equal amount of acetone, in place of the ethyl acetate an equal amount of butylacetate and in place of the polytriethyltin methacrylate an equal amount of polytrimethyltin acrylate. Similar results are obtained as in Example XXVII.

EXAMPLE XXXIV

The procedure of Example XXVII is repeated using in each case in place of the castor oil an equal amount of a polymer of the monovinyl ether of ethylene glycol having a hydroxy equivalent of 500, and in place of the polytriethyltinmethacrylate using an equal amount of polytripropyltinmethacrylate. Similar results are obtained as in Example XXVII.

EXAMPLE XXXV

The procedure of Example XXVII is repeated using each time 22.55 parts of methylethylketone and omitting the toluene, double the amount of ethanol and omitting the monobutylether of ethylene glycol. The results are similar to those of Example XXVII.

EXAMPLE XXXVI

The procedure of Example XXVII is repeated using each time double the amount of monobutylether of ethylene glycol and omitting the ethanol, 23.8 parts of benzene and omitting the methylalkylketone. The results are similar to those in Example XVII.

EXAMPLE XXXVII

The procedure of Example XXVII is repeated with similar good anti-fouling results using in place of the tin carboxylate polymer P-1 equal amounts respectively of:
(a) Alkyd tin Polymer B
(b) Alkyd tin Polymer C
(c) Alkyd tin Polymer D
(d) Tin carboxylate Polymer P-2
(e) Tin carboxylate Polymer P-6
(f) Tin carboxylate Polymer P-9

While reference is made hereinabove as to partially hydrolyzed vinyl ester homopolymers and vinyl ester copolymers with vinyl chloride being suitable in the practice of this invention, it is intended that suitably partially hydrolyzed polymers include in general those of polymers of vinyl esters containing at least 25 molar percent, preferably at least 50 molar percent vinyl ester, preferably vinyl acetate, propionate, butyrate, etc. In addition to the vinyl chloride specified above, other comonomers may be used with the vinyl ester provided that the comonomers contain only groups which are inert during the polymerization and the hydrolysis or which may be simultaneously hydrolyzed to give the desired degree of hydrolysis. Such comonomers may include ethylene, propylene, butene-1, styrene, acrylonitrile, etc. For the purposes of this invention the "partial hydrolysis" advantageously involves 23-25 molar percent preferably 5-15 molar percent of the total repeating units in the polymer molecules which includes copolymer molecules. In the examples given above the vinyl acetate polymers are 3% hydrolyzed.

While certain features of this invention have been described in detail with respect to various embodiments thereof, it will of course be apparent that other modifications can be made within the spirit and scope of this invention and it is not intended to limit the invention to the exact details shown above except insofar as they are defined in the following claims.

The invention claimed is:

1. An anti-fouling, film-forming composition comprising:
(a) a hydrophilic component selected from the group consisting of (1) castor oil; (2) partially dehydrated castor oil having a hydroxyl equivalent weight of 600-800, (3) a partially hydrolyzed polyvinylester having a hydroxyl equivalent weight of 300-600; (4) a polymer of a hydroxyalkyl acrylate or of a hydroxyalkyl alpha-alkyl-acrylate having no more than 4 carbon atoms in said hydroxylalkyl or in said alpha-alkyl group and said polymer having a molecular weight in the range of 80,000-120,000 and a hydroxyl equivalent weight in the range of 100-900; (5) a partially hydrolyzed copolymer of vinyl chloride and vinyl ester having a hydroxyl equivalent weight of 300-600; and (6) a polymer of a monovinyl or monoalphamethylvinyl or monoalphaethylvinyl ether of an alkylene glycol having 2-6 carbon atoms, said polymer having a hydroxyl equivalent weight of 300-600;
(b) a hydrophobic component having no more than 35 carbon atoms therein and having 1-3 urethane groups per molecule;
(c) a solvent component having one or more compounds selected from the group consisting of a hydroxyl-containing compound having the formula $R''(OH)_{n'}$ wherein $R''$ represents an aliphatic, arylaliphatic or cycloaliphatic hydrocarbon group having 2-10 carbon atoms and $n'$ is an integer having a value of 1-3, $R''$ may also have 1 carbon atom when $n'$ is 1, a monoether or monoester of an alkylene glycol having no more than 10 carbon atoms, an aromatic hydrocarbon having a kauri butanol value of 73–105, and a ketone having no more than 10 carbon atoms; and (d) an organic tin polymer derived by the reaction of a COOH-containing polymer with $R_3SnOH$ or $(R_3Sn)_2O$ wherein R is a lower alkyl, cycloalkyl or aryl radical 2. The composition of claim 1, in which said hydrophilic component is castor oil.

3. The composition of claim 1, in which said hydrophilic component is a partially dehydrated castor oil having a hydroxyl equivalent weight of 600–800.

4. The composition of claim 1, in which said hydrophilic component is a polymer of a hydroxy-alkyl acrylate or of a hydroxy-alkyl alpha-alkyl-acrylate in which each said alpha-alkyl group in said hydroxyl-alkyl and in said alpha-alkyl acrylate has no more than 4 carbon atoms and said polymer has a hydroxy equivalent weight of 400–700.

5. The composition of claim 1, in which said hydrophilic component is a partially hydrolyzed polyvinylester having a hydroxyl equivalent of 300–600.

6. The composition of claim 5, in which said partially hydrolyzed polyvinylester is partially hydrolyzed polyvinylacetate.

7. The composition of claim 1, in which said hydrophilic component is a partially hydrolyzed copolymer of vinyl chloride and a vinyl ester having a hydroxyl equivalent weight of 300–600.

8. The composition of claim 7, in which said vinyl ester is vinyl acetate.

9. The composition of claim 1, in which said hydrophobic component has an average of 2 urethane groups per molecule.

10. The composition of claim 9, in which said hydrophobic component is the reaction product of a diisocyanate and a monohydric compound selected from the group consisting of monohydric alcohols and a monoalkylether of a glycol.

11. The composition of claim 10, in which said reaction product is derived from a diisocyanate selected from the group consisting of hexamethylene diisocyanate, tolylene diisocyanate and phenylene diisocyanate and from a monohydric compound selected from the group consisting of ethanol, propanol, butanol, and the monoethyl and monopropyl ethers of ethylene and propylene glycols.

12. The composition of claim 11, in which said monohydric compound is selected from the group consisting of ethanol and the monoethyl ether of ethylene glycol.

13. The composition of claim 1, in which said COOH-containing polymer is derived an alkyd resin having an acid number of at least 20.

14. The composition of claim 1, in which said COOH-containing polymer is a polymer of acrylic acid or an alpha-alkyl acrylic acid in which said alpha-alkyl group has no more than 4 carbon atoms.

15. The composition of claim 14, in which said polymer is a polymer of methacrylic acid.

16. The composition of claim 1, in which on the basis of solids content there is 19–38 percent by weight of the hydrophilic component, 6–12 percent by weight of the hydrophobic component, and 50–75 percent by weight of the said organic tin polymer.

17. The composition of claim 16, in which there is 18–30 percent by weight of the hydrophilic component, 6–8 percent by weight of the hydrophobic component and 65–75 percent by weight of the said tin polymer.

18. The composition of claim 16, in which said hydrophobic component is the reaction product of a diisocyanate and a monohydric compound selected from the group consisting of monohydric alcohols and monoalkylethers of glycols.

19. The composition of claim 16, in which said reaction product is from a diisocyanate selected from the group consisting of hexamethylene diisocyanate, tolylene diisocyanate, diphenylmethane diisocyanate, isophorone diisocyanate, decylene diisocyanate and phenylene diisocyanate and said monohydric compound is selected from the group consisting of ethanol, propanol, butanol, and the monoethyl and monopropyl ethers of ethylene glycol, propylene glycol and diethylene glycol.

20. The composition of claim 19, in which said monohydric compound is selected from the group consisting of ethanol and the monoethyl ether of ethylene glycol.

21. The composition of claim 20, in which said organic tin polymer is derived by the reaction of a tin compound selected from the group consisting of the hydroxide or oxide of tri-n-butyltin, tri-n-propyltin and tri-n-phenyltin with a polymeric acid selected from the group consisting of polymethacrylic, polyacrylic and poly(vinylbenzoic) acids.

22. The composition of claims 1, 2, 8, 9, 13 or 18 in which said hydrophobic component has no more than 20 carbon atoms therein.

23. The composition of claim 1, in which said hydrophilic component comprises 10.45–16.72 percent by weight of castor oil; and hydrophobic component comprises 3.7–6 percent by weight of the reaction product of toluene diisocyanate and ethyl alcohol; 39.6–49.5 percent by weight of said organic tin polymer and the balance making up 100 percent by weight comprises one or more solvents selected from the group consisting of ethyl alcohol, methylethyl ketone, n-butylmonoether of ethylene glycol, toluene and ethyl acetate.

24. The composition of claim 23 in which said tin polymer is derived from an alkyd resin having an acid number of at least 20.

25. The composition of claim 23 in which said tin polymer is derived from a polymer of acrylic acid or an alpha-alkyl acrylic acid in which said alpha-alkyl group has no more than 4 carbon atoms.

26. An anti-fouling coating deposited on a surface of an object to be submerged in sea water comprising 50–75 percent by weight based on said coating of an organic tin polymer derived by the reaction of a carboxylic acid-containing polymer with $R_3SnOH$ or $(R_3Sn)_2O$ wherein R is a lower alkyl, cycloalkyl or aryl radical; 19–38 percent by weight of a hydrophilic component selected from the group consisting of (a) castor oil; (b) partially dehydrated castor oil having a hydroxyl equivalent weight of 600–800; (c) a polymer of a hydroxy-alkyl acrylate or a hydroxyl-alkyl alpha-alkylacrylate having no more than 4 carbon atoms in said alpha-alkyl group in said hydroxyl-alkyl and in said alpha-alkyl group and a hydroxyl equivalent weight in the range of 400–700; (d) a partially hydrolyzed polyvinylester having a hydroxyl equivalent weight of 300–600; (e) a partially hydrolyzed copolymer of vinyl chloride and vinyl ester having a hydroxyl equivalent weight of 300–600; and (f) a polymer of a monovinyl, monoalphamethyl or monoalphaethyl ether of an alkylene glycol having 2–6 carbon atoms, said polymer having a hydroxyl equivalent weight of 300–600, and a hydrophobic component having no more than 35 carbon atoms therein and having 1-3 urethane groups per molecule.

27. The anti-fouling coating of claim 26, in which said carboxylic acid-containing polymer is an alkyd resin having an acid number of at least 20; said hydrophilic component is castor oil; and said hydrophobic component is the reaction product of a diisocyanate selected from the group consisting of hexamethylene diisocyanate, tolylene diisocyanate, diphenylmethane diisocyanate, isophorone diisocyanate, decylene diisocyanate and phenylene diisocyanate with a monohydric compound selected from the group consisting of ethanol, propanol, butanol and the monoethyl and monopropyl ethers of ethylene and propylene glycols.

28. The anti-fouling coating of claim 26, in which said carboxylic acid-containing polymer is a polymer of acrylic acid or an alpha-alkylacrylic acid in which said alpha-alkyl group has no more than 4 carbon atoms therein; said hydrophilic component is castor oil; and said hydrophobic component is the reaction product of a diisocyanate selected from the group consisting of hexamethylene diisocyanate, tolylene diisocyanate, diphenylmethane diisocyanate, isophorone diisocyanate, decylene diisocyanate and phenylene diisocyanate with a monohydric compound selected from the group consisting of ethanol, propanol, butanol and the monoethyl and monopropyl ethers of ethylene and propylene glycols.

29. The coating of claim 28 in which said acrylic acid is metharcylic acid.

30. The coating of claim 26, in which said hydrophobic component has no more than 20 carbon atoms therein.

31. The process of protecting a surface of an object from fouling by exposure to sea water comprising the steps of applying to said surface a film-forming composition comprising:
(a) 10-22 percent by weight of a hydrophilic component selected from the group consisting of (1) castor oil; (2) partially dehydrated castor oil having a hydroxyl equivalent weight of 600-800; (3) a polymer of a hydroxyalkyl acrylate or of a hydroxylalkyl alpha-alkyl acylate having no more than 4 carbon atoms in said alpha-alkyl group in said hydroxylalkyl and in said alpha-alkyl and said polymer having a molecular weight in the range of 80,000-120,000 and an hydroxyl equivalent weight in the range of 100-900; (4) a partially hydrolyzed polyvinylester having a hydroxyl equivalent weight of 300-600; (5) a partially hydrolyzed copolymer of vinyl chloride and vinyl ester having a hydroxyl equivalent weight of 300-600; and (6) a polymer of a monovinyl, monalphamethyl vinyl or monoalphaethyl vinyl ether of an alkylene glycol having 2-6 carbon atoms, said polymer having a hydroxyl equivalent weight of 300-600;
(b) 2.5-7.5 percent by weight of a hydrophobic component having no more than 35 carbon atoms therein and having 1-3 urethane groups per molecule;
(c) 30-50 percent by weight of an organic tin polymer derived by the reaction of a COOH-containing polymer with $R_3SnOH$ or $(R_3Sn)_2O$ wherein R is a lower alkyl, cycloalkyl or aryl radical; and
(d) 20-40 percent by weight of a solvent component having one or more compounds selected from the group consisting of a hydroxyl-containing compound having the formula $R''(OH)_{n'}$ wherein $R''$ represents an aliphatic, arylaliphatic or cycloaliphatic hydrocarbon group having 2-10 carbon atoms, except that $R''$ may also have one carbon atom when $n'$ is 1, and $n'$ is an integer having a value of 1-3, a monoether or monoester of an alkylene glycol having no more than 10 carbon atoms, an aromatic hydrocarbon having a kauri butanol value of 73-105, and a ketone having no more than 10 carbon atoms;

and allowing said coating to dry to a hard film before the resultant coated surface is exposed to sea water.

32. The process of claim 31 in which said hydrophilic component comprises 10.5-16 percent by weight of said composition.

33. The process of claim 32 in which said hydrophobic component comprises 3.5-6 percent by weight of said composition.

34. The process of claim 33 in which said tin polymer component comprises 40-50 percent by weight of said composition.

35. The process of claim 34 in which said solvent comprises 30-38 percent by weight of said composition.

36. The process of claim 31 in which said hydrophobic component has no more than 20 carbon atoms therein.

37. The process of claim 35 in which said hydrophobic component has no more than 20 carbon atoms therein.

* * * * *